United States Patent [19]

Lievens et al.

[11] Patent Number: 5,756,186
[45] Date of Patent: May 26, 1998

[54] LAYERED REFLECTOR FOR LIGHT RADIATION, ITS MANUFACTURE AND ITS USE

[75] Inventors: Hugo Lievens, Ghent; Pascal Verheyen, Gavere, both of Belgium

[73] Assignee: N.V. Bekaert S.A., Belgium

[21] Appl. No.: 591,473

[22] PCT Filed: Jul. 12, 1994

[86] PCT No.: PCT/BE94/00044

§ 371 Date: Jan. 11, 1996

§ 102(e) Date: Jan. 11, 1996

[87] PCT Pub. No.: WO95/03510

PCT Pub. Date: Feb. 2, 1995

[30] Foreign Application Priority Data

Jul. 19, 1993 [BE] Belgium ................... 9300758

[51] Int. Cl.$^6$ ..................... B32B 3/00
[52] U.S. Cl. ............ 428/195; 428/344; 428/352; 428/411.1; 428/461; 428/483; 428/500; 428/688; 428/913
[58] Field of Search ............... 428/411.1, 195, 428/913, 201, 204, 500, 461, 352, 483, 688, 917, 344

[56] References Cited

U.S. PATENT DOCUMENTS 5,014,174 5/1991 Won et al. .................. 362/309

FOREIGN PATENT DOCUMENTS

| 2241981 | 3/1974 | Germany . | |
|---|---|---|---|
| 0034392 | 2/1980 | WIPO | B32B 15/08 |
| 0235057 | 2/1986 | WIPO | G11B 5/64 |
| 0516489 | 1/1992 | WIPO | F21V 7/22 |

*Primary Examiner*—William Krynski
*Attorney, Agent, or Firm*—Nixon & Vanderhye P.C.

[57] ABSTRACT

The invention relates to a layered reflector (1) for light radiation comprising: a) a scratch resistant outer layer (2) transmitting this radiation, b) a first resin layer (3) bonded to it, which is provided with slip properties at least at its contact side (7) with the outer layer (2) and which layer c) is covered at its opposite side with a layer (4) reflecting said radiation and which by interposition of a bonding layer (6), d) is laminated to a second resin layer (5) which has slip properties at least at its free outer surface (8) opposite to the contact side bonding layer. The invention relates also to a process and intermediate products for manufacturing the reflector as well as a self-adhesive reflector (15) derived therefrom and a light reflecting structure (16).

10 Claims, 1 Drawing Sheet

LAYERED REFLECTOR FOR LIGHT
RADIATION, ITS MANUFACTURE AND ITS
USE

The invention relates to a reflector for light radiation. In particular the invention relates to a reflector used in lamp fittings or supports and having an enhanced durability: i.a. an improved scratch resistance of its outer surface and a better chemical resistance.

It is known to build up a high gloss, layered and flexible reflector substrate for lamp supports, comprising a plastic foil which allows light transmission which has a smooth outer surface and on the opposite surface of which a reflecting layer is applied. A corrosion resistant protective covering is present on the reflecting layer. This layered substrate can be bonded to the metal support by means of a suitable glue or adhesive.

Although the reflecting layer in this high gloss reflector is reasonably protected, due to the substantial thickness of the foil, its surface appears to be insufficiently hard and hence it is not scratch resistant. In other words the outer surface of the reflector has a too low abrasion resistance. In addition, the chemical resistance of the surface, i.a. against chemical cleaning agents, is unsatisfactory.

It is an object of the invention to avoid these disadvantages.

The invention meets this objective by providing a layered reflector for light radiation comprising a) a scratch resistant outer layer transmitting this radiation, b) a first resin layer bonded to it, which is provided with slip properties at least at its contact side with the outer layer and which layer d) is laminated to a second resin layer which has slip properties at least at its free outer surface opposite to the contact side with the bonding layer.

It is another object of the invention to provide a process for manufacturing the reflector. In particular the invention provides suitable measures for composing the layered reflector.

According to the invention this objective is achieved by using the following process steps:

A layered core sheet is first composed which is further covered with the outer layer mentioned before. For the manufacture of the core sheet a) a first plastic or resin foil, having slip properties on one side, is covered at its opposite side with a reflecting layer and subsequently b) the thus obtained substrate is fixed on a second resin foil, having an outer surface with slip properties.

Details of the invention will now be illustrated with reference to the attached drawings and examples. Additional features and their advantages will thereby be explained.

Figure 1:
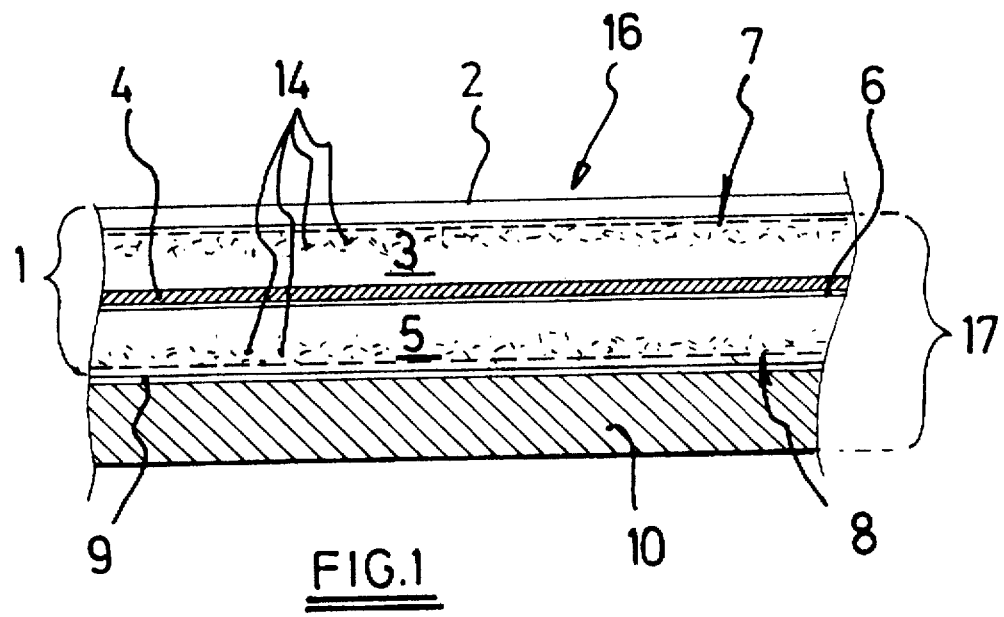
FIG. 1 is a cross section view of the layered composition of the reflector according to the invention as fixed to a support.

The reflector 1 comprises as a substrate a first transparent, i.e. light transmitting resin layer 3 which has an area 7 with known slip properties at least at its contact side with the outer layer 2. This layer 3 is preferably a commercially available plastic foil, e.g. from polyester, in particular a polyetylenetereftalate foil which is covered on one side with a conventional slip coating 7 which allows easy winding and unwinding of the foil. The foil thickness is preferably between 10 µm and 30 µm. An optically clear foil MYLAR®D (trademark of Du Pont de Nemours) with a thickness of 23 µm is well suited. A MELINEX® 442 foil (trademark of ICI) with a thickness of 12 µm (and haze factor 0.5%) is equally usable. A suitable filler 14 (e.g. $SiO_2$ particles) can be present in view of providing the required slip properties. Layer 3 can also be treated or contain additives to assure sufficient resistance to UV radiation to meet e.g. grade 5 or more of the wool scale (ISO standard 105-B01). This first resin layer 3 has on its opposite side a smooth surface in view of applying thereto afterwards a smooth reflecting layer 4. This layer, e.g. from silver, can be applied by a plasma sputtering technique (DC magnetron sputtering). Gold, aluminium or chrome can also be used as reflecting layer 4. The thickness of layer 4 will often be chosen between 0.08 and 0.2 µm.

Figure 3:
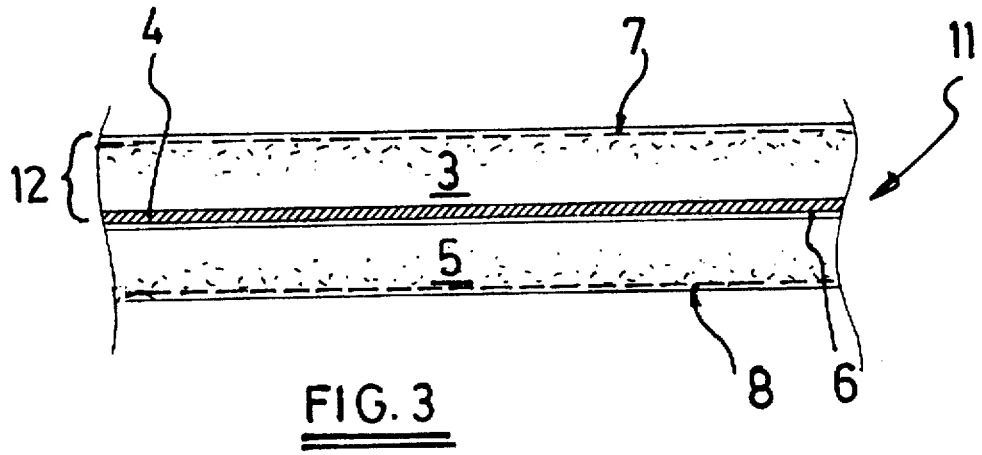
FIG. 3 represents a core sheet as intermediate product for the reflector.

A second resin layer 5 is now fixed or bonded to the free surface of layer 4 of this double layered substrate 12 through interposition of a conventional bonding layer 6; e.g. a polyester adhesive layer. The second resin layer should not be optically clear. However it should have a slip layer 8 on its side opposite of bonding layer 6. A suitable filler 14 (e.g. $SiO_2$ particles) can again be present herein in view of the required slip properties. A polyester foil of the type AH 5000 with a thickness of 12 µm is well suited. Thicker foils are suitable as well. In this way a reflecting core sheet 11 is composed as shown in FIG. 3, having slip properties on both sides and that thus can easily be wound and unwound as an intermediate product.

The outer layer 2 can now be applied on the slip layer 7 of the core sheet 11 to be unwound from its stock. When this outer layer comprises a crosslinked acrylate resin this can be done by casting a viscous solution of the resin on the slip layer 7, e.g. by means of a roll coating method, and by evaporating the solvent to obtain the hard coating 2 as outer layer. According to an alternative method the outer layer 2 can be produced through transfer coating on a smooth drum surface, (partially) cured there and subsequently deposited on the slip layer 7. The resin of the outer layer 2 has preferably an intrinsic total luminous transmission (TLT) of at least 90% of the luminous flux incident upon it when measured according to the test procedure A of the ASTM test D 1003. Since air and the material of the outer layer have a different diffraction index, the maximum total luminous transmittance Tl obtainable is generally not greater than 92% of the incident luminous flux. The thickness of the outer layer 2 is chosen between 2 and 10 µm and is preferably about 4 µm. If needed, materials will be added to the resin of the outer layer 2 to preserve its resistance against ultraviolet radiation according to e.g. a degree 5 or more on the wool scale (ISO standard 105-B01). Resin types DYNEL of the company US Lamco or REFLEX of the company Rexham can be mentioned as suitable. In this way a high gloss reflector is produced. Other additives, such as e.g. antistatic agents, can also be incorporated in the layer 2.

The layer 2 should also present a satisfactory hardness or scratch resistance, i.e. a sufficient abrasion resistance. In practice this means that by using the ASTM D 1044 taber abrasion test, the variation of diffusivity with a load of 500 g under a CS10-F wheel remains limited; i.o.w. that the smooth surface is not roughened too easily. In particular, the diffusivity may only increase 3.5% at the most after 10 abrasion cycles and preferably not more than 3.5% after 50 or even 100 cycles.

This layered structure 1 can thus again be wound and unwound conveniently due to the fact that the core sheet 11 with outer layer 2 gets again a surface 8 with suitable slip properties.

The invention is particularly suitable for producing high gloss reflectors, i.e. having a diffusivity of at most 3%. However also low gloss or semi low gloss reflectors can be produced by applying in the surface of the outer layer 2 a certain embossed or textured pattern. This surface is thereby roughened to a certain extent and the incident light radiation is partially diffused and the diffuse luminous transmittance Td, defined according to procedure A of the ASTM test D 1003 decreases substantially below 90% to a desired value. This value (Td), depending on the embossed texture, is chosen larger than 5%. If a semi-gloss reflector is desired, then the diffusivity is set at about 50%. For a low gloss reflector the diffusivity is about 73%. Td/Tl is than per definition the haze factor. The coating roll will then have a rough surface obtained by a laser treatment in view of imprinting a rough embossed surface in the outer layer surface. The degree of roughness of the coating roll surface shall of course be chosen in view of the desired diffusivity of layer 2. The desired roughness can also be achieved by blending suitable additives in the resin.

Figure 2:
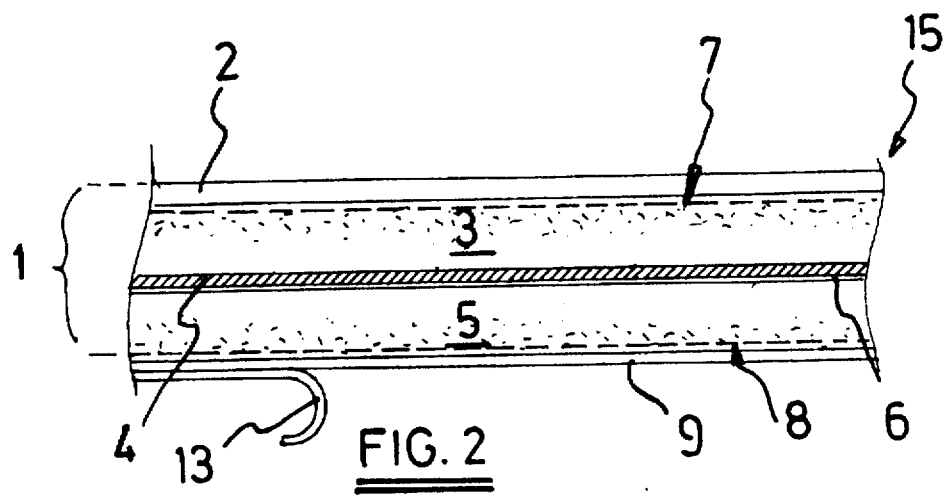
FIG. 2 relates to the composition of a self adhesive reflector.

A pressure sensitive adhesion layer 9 can be applied to the slip area 8 of the reflector 1, which layer 9 is covered by a release foil 13, e.g. a known silicon treated polyester foil. In this way a layered combination 15 is produced for a self adhesive reflector as shown in FIG. 2.

The adhesion layer 9 and the foil 13 can possibly be applied in one process step which follows the application and curing of the outer layer 2 in a continuous process.

When applying the reflector on the support 10 as a carrier the foil 13 is removed from the reflector and the reflector with pressure sensitive adhesive layer 9 is fixed by pressure to form a light reflecting structure 16. The reflector 1 can also be applied on a flat plate support 10 whereafter the so covered plate is cut or slit an bended to the desired shape. A glue or adhesive can of course also be applied to the support 10 and a layered reflector 1 can then be pressed on it to form the structure 16.

The core sheet 11 can e.g. also continuously be unwound from a stock and fixed by means of an adhesive layer 9 on a support 10 to be unwound. A scratchfree coating layer 2 can then be applied on this layered combination 17 comprising layers 10, 9 and 11. The reflecting structure 16 so obtained can be wound and unwound and strips with the desired dimensions for a reflector can be slit therefrom during unwinding.

As an alternative the core sheet 11 can be covered with a pressure sensitive adhesive layer 9 and a release foil 13. An intermediate product is so provided for the manufacture of a self adhesive reflector 15. This laminated substructure 11, 9, 13 can then be fixed to the support 10 after removal of the foil 13. Afterwards the scratch free layer 2 can be applied to the thus obtained layered combination 17.

Further, in particular for high gloss reflectors, the presence of a second resin layer 5 offers the advantage that possible unevennesses of the support surface are not imprinted in the reflecting layer 4.

The support 10 can also be a glass plate and can be covered only in part by the reflector 1. Reflecting surfaces can then be combined with transparent glass areas in view of special illumination effects.

The reflector 1 or the self adhesive reflector 15 can be collected by winding it up continuously or by slitting it directly to the desired shape and packing it.

The transparent outer layer 2 can also be a thin inorganic layer with a desired diffusivity and abrasion resistance. $SiO_2$ and/or $Al2O3$-layers with a thickness of e.g. 30 nm as well as diamond like carbon layers can be applied. These layers can be applied also by a plasma sputtering technique. Preferably they will transmit at least 90% of the light radiation. When the reflectors are intended for use in the open air weather resistant resin compositions can, be used. A composition based on a acryl/fluoropolymer is then recommended, e.g. as described in WO 90/14393.

The invention relates of course also to the covered support 16 comprising the support 10 onto which the layered reflector 1 is fixed by means of e.g. an adhesive layer 9. Besides a metal plate, it is also possible to use as support 10 a plastic plate or plastic sheet. Further, besides the use of the reflector in light fittings, the composite structure of support or carrier 10 with the layered reflector 1 is suitable for use in solar energy collectors. The support 10 with reflector 1 can then be bent in a concave cylindrical shape with the reflector layer 1 at the concave side. A tube system is then arranged in the focus of the bent surface and parallel to the cylindrical surface in view of circulating the steam to be heated e.g. for driving a steam turbine for an electrical power station.

We claim:

1. A layered reflector for light radiation comprising
   a) a scratch resistant outer layer having a diffusivity of at most 3% for transmitting light radiation,
   b) a first resin layer having one side bonded to said scratch resistant outer layer and another side opposite said one side, wherein said first resin layer has slip properties at least at said one side;
   c) a light-radiation reflecting layer which covers said another side of said first resin layer;
   d) a second resin layer having a contact surface adjacent said light-radiation reflecting layer and a free outer surface opposite said contact surface, said second resin layer having slip properties at least at its free outer surface; and
   e) a bonding layer interposed between said contact surface of said second resin layer and said light-radiation reflecting layer for laminating said light-radiation reflecting layer to said second resin layer.

2. A layered reflector for light radiation comprising
   a) a scratch resistant outer laver for transmitting light radiation,
   b) a first resin layer having one side bonded to said scratch resistant outer layer and another side opposite said one side, wherein said first resin layer has slip properties at least at said one side;
   c) a light-radiation reflecting laver which covers said another side of said first resin layer;
   d) a second resin layer having a contact surface adiacent said light-radiation reflecting layer and a free outer surface opposite said contact surface, said second resin layer having slip properties at least at its free outer surface;
   e) a bonding layer interposed between said contact surface of said second resin layer and said light-radiation reflecting layer for laminating said light-radiation reflecting layer to said second resin layer; and
   (f) a release foil bonded to said free outer surface by means of a pressure sensitive adhesive, whereby the reflector is self adhesive.

3. A reflector according to claim 1 or 2, wherein the scratch resistant outer layer is a cross linked acrylate resin.

4. A reflector according to claim 1 or 2, wherein the scratch resistant outer layer has an embossed pattern surface.

5. A reflector according to claim 1 or 2, wherein the light-radiation reflecting layer is a plasma-sputtered silver layer.

6. A reflector according to claim 1 or 2, wherein the first resin layer is polyester.

7. A reflector according to claim 1 or 2, wherein the second resin layer (5) is polyester.

8. A reflector according to claim 1 or 2, further comprising a filler which is present in at least one of the first and second resin layers for providing the slip properties thereto.

9. A light reflecting structure comprising a support, and a layered reflector bonded to said support by means of an adhesive layer, wherein said layered reflector comprises:

a) a scratch resistant outer layer having a diffusivity of at most 3% for transmitting light radiation, b) a first resin layer having one side bonded to said scratch resistant outer layer and another side opposite said one side, wherein said first resin layer has slip properties at least at said one side;

c) a light-radiation reflecting layer which covers said another side of said first resin layer;

d) a second resin layer having a contact surface adjacent said light-radiation reflecting layer and a free outer surface opposite said contact surface, said second resin layer having slip properties at least at its free outer surface; and e) a bonding layer interposed between said contact surface of said second resin layer and said light-radiation reflecting layer for laminating said light-radiation reflecting layer to said second resin layer.

10. A solar energy collector comprising a light reflecting structure, wherein said light reflecting structure includes a support, and a layered reflector bonded to said support by means of an adhesive layer, and wherein said layered reflector comprises:

a) a scratch resistant outer layer having a diffusivity of at most 3% for transmitting light radiation, b) a first resin layer having one side bonded to said scratch resistant outer layer and another side opposite said one side, wherein said first resin layer has slip properties at least at said one side;

c) a light-radiation reflecting layer which covers said another side of said first resin layer;

d) a second resin layer having a contact surface adjacent said light-radiation reflecting layer and a free outer surface opposite said contact surface, said second resin layer having slip properties at least at its free outer surface, and e) a bonding layer interposed between said contact surface of said second resin layer and said light-radiation reflecting layer for laminating said light-radiation reflecting layer to said second resin layer.

* * * * *